United States Patent
Roth et al.

(10) Patent No.: US 10,945,377 B2
(45) Date of Patent: Mar. 16, 2021

(54) BALER WITH SEGMENTED TENSION PANELS

(71) Applicant: Deere & Company, Moline, IL (US)

(72) Inventors: Darin L. Roth, Batavia, IA (US); Eric R. Lang, Newhall, IA (US)

(73) Assignee: DEERE & COMPANY, Moline, IL (US)

(*) Notice: Subject to any disclaimer, the term of this patent is extended or adjusted under 35 U.S.C. 154(b) by 376 days.

(21) Appl. No.: 15/895,395

(22) Filed: Feb. 13, 2018

(65) Prior Publication Data

US 2019/0246566 A1 Aug. 15, 2019

(51) Int. Cl.
*A01F 15/08* (2006.01)
*A01F 15/04* (2006.01)
*B30B 9/30* (2006.01)

(52) U.S. Cl.
CPC ........ *A01F 15/0825* (2013.01); *A01F 15/046* (2013.01); *B30B 9/3007* (2013.01); *B30B 9/3025* (2013.01)

(58) Field of Classification Search
CPC .... A01F 15/0825; A01F 15/046; A01F 15/06; B30B 9/3025; B30B 9/3007; B30B 9/30; B30B 9/3003; B30B 9/3032
See application file for complete search history.

(56) References Cited

U.S. PATENT DOCUMENTS

| | | | | |
|---|---|---|---|---|
| 2,470,278 A * | 5/1949 | West | ................ | A01F 15/0825 100/191 |
| 3,424,081 A * | 1/1969 | Hoke | ................ | A01F 15/0825 100/192 |
| 3,479,950 A * | 11/1969 | Freeman | ................ | B30B 9/301 100/49 |
| 4,489,648 A * | 12/1984 | Naaktgeboren | ....... | B30B 9/3025 100/191 |
| 4,594,942 A * | 6/1986 | Denneboom | ........... | B30B 9/301 100/137 |
| 5,819,643 A | 10/1998 | McIlwain et al. | | |
| 6,698,343 B2 * | 3/2004 | Chassiboud | .......... | A01F 15/042 100/191 |

(Continued)

FOREIGN PATENT DOCUMENTS

| DE | 287188 A5 | 2/1991 | | |
|---|---|---|---|---|
| EP | 1095558 A1 * | 5/2001 | ........... | A01F 15/005 |

(Continued)

OTHER PUBLICATIONS

Extended European Search Report for application No. 19156640 dated Jun. 7, 2019.

*Primary Examiner* — Gregory D Swiatocha
(74) *Attorney, Agent, or Firm* — Klintworth & Rozenblat IP LLP

(57) ABSTRACT

A baler includes a frame and a bale chamber structure that is supported by the frame. The bale chamber structure includes a plurality of walls that cooperate to define a baling chamber that extends along a longitudinal axis. The plurality of walls shape different sides of the bale. At least one of the plurality of walls includes a first segment panel that is moveably attached to the frame and a second segment panel that is arranged in a downstream direction from the first segment panel with respect to the longitudinal axis. The second segment panel is moveably attached to the frame independent of the first segment panel.

17 Claims, 3 Drawing Sheets

(56) References Cited

U.S. PATENT DOCUMENTS

| | | | |
|---|---|---|---|
| 6,715,410 | B2 | 4/2004 | Boucher et al. |
| 7,975,607 | B2 | 7/2011 | Hoover et al. |
| 7,992,491 | B1 * | 8/2011 | Lanning .................. B30B 9/301 |
| | | | 100/215 |
| 8,240,247 | B2 * | 8/2012 | Wincott .................. B30B 15/08 |
| | | | 100/3 |
| 8,430,025 | B2 | 4/2013 | Lanning et al. |
| 8,635,951 | B2 | 1/2014 | Vandamme |
| 8,807,024 | B2 | 8/2014 | Bonte et al. |
| 8,925,451 | B2 * | 1/2015 | Lanning .................. B30B 9/301 |
| | | | 100/215 |
| 9,038,532 | B2 | 5/2015 | Naeyaert |
| 9,226,451 | B2 | 1/2016 | Boone et al. |
| 2010/0224085 | A1 | 9/2010 | Hoover et al. |
| 2012/0204737 | A1 | 8/2012 | Olander et al. |
| 2016/0113206 | A1 | 4/2016 | Kraus |
| 2017/0013782 | A1 | 1/2017 | Kindt et al. |
| 2017/0367267 | A1 * | 12/2017 | Schrag ................ A01F 15/0825 |
| 2018/0192591 | A1 * | 7/2018 | Monbaliu ............ A01F 15/0825 |

FOREIGN PATENT DOCUMENTS

| | | | |
|---|---|---|---|
| EP | 1095558 | A1 | 5/2001 |
| EP | 2614704 | A1 | 7/2013 |
| EP | 3117699 | A1 | 1/2017 |
| FR | 1340188 | A | 10/1963 |
| NL | 2000013 | C2 | 8/2007 |
| WO | 2016100223 | A1 | 6/2016 |
| WO | 2017005635 | A1 | 1/2017 |
| WO | 2017009194 | A1 | 1/2017 |

\* cited by examiner

BALER WITH SEGMENTED TENSION PANELS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural balers and, more specifically, relates to balers with segmented tension panels.

BACKGROUND OF THE DISCLOSURE

In various agricultural and other settings, it may be useful to form bales from crop (or other plant) material, such as hay or corn stover. Various machines or mechanisms may be utilized to gather material (e.g., from a windrow along a field) and process it into bales.

The formed bales may have various sizes and, in certain applications, may exhibit generally rectangular or other cross-sections. In order to create rectangular bales, for example, a "square" baler may travel along a windrow of cut crop material gathering the material into a baling chamber. A reciprocating plunger or other mechanisms may then compress the crop material into bales, which are subsequently output from the baler.

SUMMARY OF THE DISCLOSURE

This disclosure provides a baler with segmented tension panels, which may improve control of the shape and density of bales formed with the baler.

In one aspect, the disclosure provides a baler that includes a frame and a bale chamber structure that is supported by the frame. The bale chamber structure includes a plurality of walls that cooperate to define a baling chamber that extends along a longitudinal axis. The plurality of walls shape different sides of the bale. At least one of the plurality of walls includes a first segment panel that is moveably attached to the frame and a second segment panel that is arranged in a downstream direction from the first segment panel with respect to the longitudinal axis. The second segment panel is moveably attached to the frame independent of the first segment panel.

In another aspect, a method of operating a baler is disclosed. The method includes operating a baler having a bale chamber structure that defines a variable baling chamber that extends along a longitudinal axis. The baling chamber is partly defined by a wall configured to define a side of a bale of crop material. The method includes actuating a first segment panel of the wall relative to a frame about a first joint that moveably attaches the first segment panel to the frame. Furthermore, the method includes actuating a second segment panel of the wall relative to the frame about a second joint that moveably attaches the second segment panel to the frame independent of the first segment panel.

In an additional aspect, a baler is disclosed that is configured to form a rectangular bale of crop material. The baler includes a frame with a first elongate member and a second elongate member that are spaced apart in a vertical direction to define an opening between the first elongate member and the second elongate member. The baler also includes a bale chamber structure that is supported by the frame. The bale chamber structure includes a plurality of walls that cooperate to define a baling chamber that extends along a longitudinal axis. The plurality of walls is configured to shape different sides of the bale. At least one of the plurality of walls includes a first segment panel that is received in the opening and that is moveably attached to the first elongate member and the second elongate member via a first pivot joint. The at least one wall includes a second segment panel that is arranged in a downstream direction from the first segment panel with respect to the longitudinal axis. The second segment panel is received in the opening and moveably attached to the first elongate member and the second elongate member via a second pivot joint that is independent of the first segment panel. The second segment panel is configured for movement that varies a size of a gap between the first segment panel and the second segment panel. Furthermore, the baler includes an actuator system configured to independently actuate the first segment panel and the second segment panel relative to the frame. Moreover, the baler includes a control system configured to control the actuator system to control independent movement of the first segment panel and the second segment panel relative to the frame.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
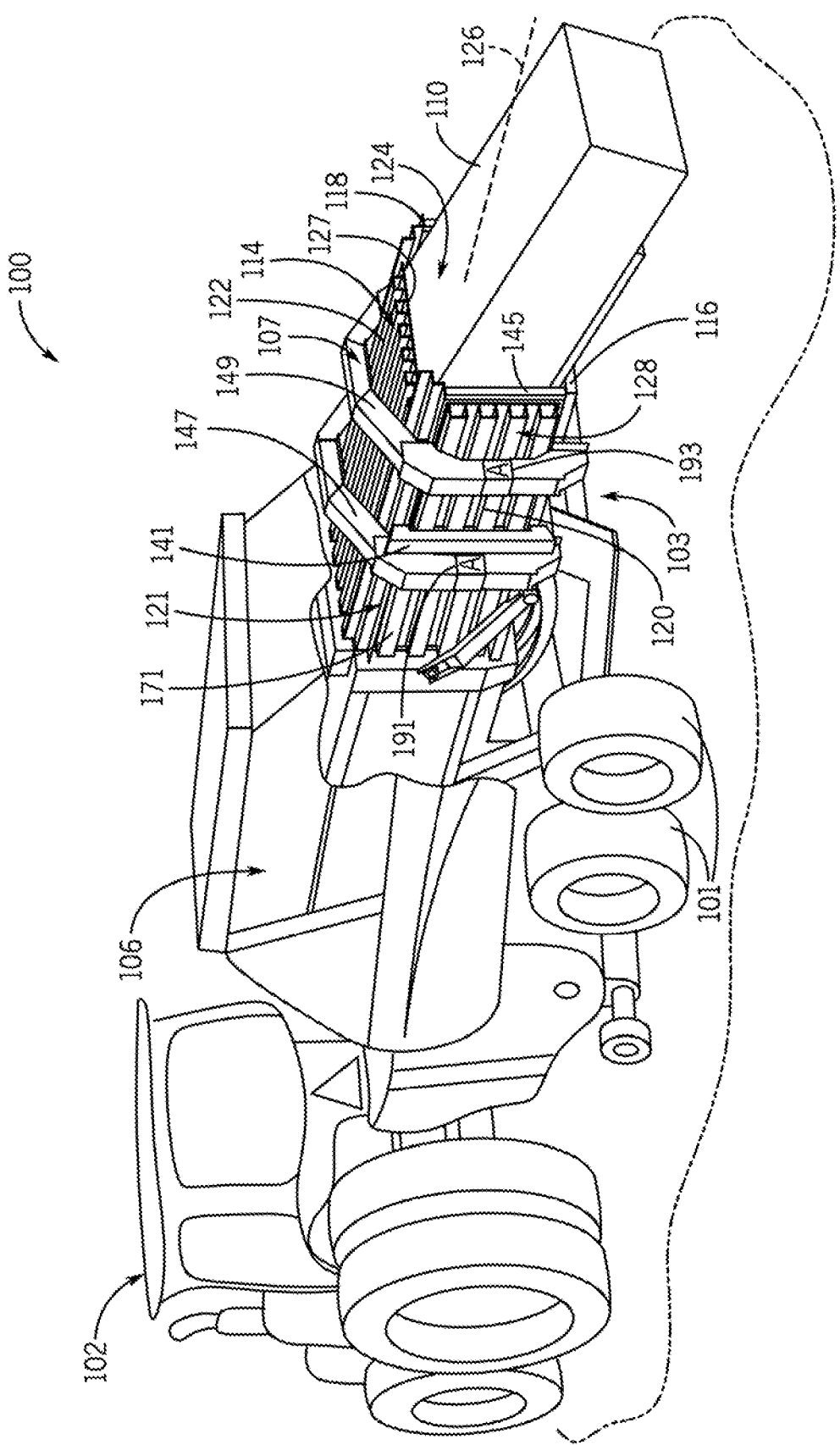
FIG. 1 is rear perspective view of a baler according to example embodiments of the present disclosure.

The following describes one or more example embodiments of an agricultural baler with a baling chamber that is defined by a plurality of walls. The different walls are configured for shaping different sides of a bale of agricultural material. At least one wall includes a plurality of segmented panels (i.e., doors, tension panels, etc.) that are arranged along the axis of the baling chamber. The segmented panels are decoupled from each other and configured for independent movement as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "longitudinal," "transverse," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The terms "fore-aft axis" and "longitudinal axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, may refer to an axis or a direction orthogonal to the horizontal plane containing the fore-aft and lateral axes. The term the "transverse direction" may refer to the lateral direction or the vertical direction (i.e., transverse to the longitudinal axis).

The following describes one or more example implementations of the disclosed baler as shown in the accompanying figures. The disclosed baler, its method of manufacture and assembly, and its method of operation provide a number of benefits as compared to conventional balers.

Generally, the baler of the present disclosure may be supported for travel over a crop, ground, field, etc. by wheels mounted to a chassis. The baler may include a pick-up assembly for gathering crop material. The crop material gathered by the pick-up assembly may be routed upward and rearward through the baler and formed into flakes in some embodiments. The baler may also successively compress multiple flakes of crop material together using a bale chamber structure. The bale chamber structure may define a baling chamber wherein the flakes are compressed until the bale has been formed.

The bale chamber structure may include one or more walls (i.e., structural members, tension panels, etc.) that define the inner surfaces of the baling chamber. The walls may extend along a longitudinal axis of the baling chamber. The walls may contain the crop material and serve to restrict its movement as it travels through the baling chamber.

In some embodiments, at least one wall may comprise a plurality of segment panels (i.e., doors, etc.). The segment panels may be arranged end-to-end along the longitudinal axis of the baling chamber in some embodiments. The segment panels may be moveably attached to a frame of the baler independent of each other. For example, the segment panels may be pivotally (rotationally) attached to the frame via independent joints. Thus, in some embodiments, the segment panels may be decoupled from each other. Accordingly, the segment panels may move independent of each other when moving relative to the frame.

By moving the segment panels relative to each other, a cross section of the baling chamber (taken perpendicular to the longitudinal axis) and/or a longitudinal profile of the baling chamber (taken along the longitudinal axis) may be changed. Also, the forces on one segment panel may transfer directly to the frame, without transferring to another segment panel. More specifically, a force restraining one segment panel against longitudinal movement may transfer directly to the frame instead of transferring to another segment panel.

The baler may further include an actuator system for actuating at least one of the segment panels relative to another. In some embodiments, the actuator system may include an associated control system for controlling movement of the panels. Thus, the geometry of the baling chamber may be adjusted in a controlled manner. Also, pressure, compressive force, frictional force, and/or other loads on the flake or other crop material within the baling chamber may be controlled, adjusted, and finely tuned via control of the actuator system.

Accordingly, the density of the bale may be controlled. In other words, the baler of the present disclosure may repeatedly provide bales that have a substantially consistent density during operation, regardless of the particular characteristics of the crop material being baled. The baler may provide a wide range of extruding forces on the crop material, and the independently moveable segment panels may distribute the loads along the length of the baling chamber. Furthermore, the baler of the present is configured to distribute loads more evenly because of the segmented and independently moveable segment panels.

The baling chamber may also be adjusted, for example, according to one or more characteristics of the crop material. For example, the segment panels may be adjusted according to the type of crop, the moisture level of the crop material, or other characteristics.

Referring now to FIG. 1, a work vehicle, such as a baler 100, is depicted according to example embodiments of the present disclosure. In some embodiments, the baler 100 may include one or more wheels 101 that are attached to a chassis 103. The baler 100 is shown being towed by a towing vehicle 102, such as a tractor. The towing vehicle 102 may be hitched to the baler 100 in some embodiments. It will be appreciated that the baler 100 may be towed by another vehicle without departing from the scope of the present disclosure. It will also be appreciated that the baler 100 may be self-propelled without departing from the scope of the present disclosure.

The baler 100 may encounter a windrow or other arrangement of crop material (not shown) during travel through the field. A pick-up assembly 106 may gather the crop material and move it into a baling implement 107 for forming a bale 110 of the crop material. The baling implement 107 may be disposed rearward from the pick-up assembly 106 with respect to a travel direction of the baler 100.

Generally, the baling implement 107 may include a frame 121 and a bale chamber structure 114. The bale chamber structure 114 may define a baling chamber 124. Crop material may move rearward along a longitudinal axis 126 of the baling chamber 124, and the inner surfaces of the bale chamber structure 114 may compress and shape respective sides of the bale 110, and the bale 110 may be output from the rear end of the baler 100.

In some embodiments, the bale chamber structure 114 may be configured as a square baler, which is configured to form the bale 110 with a cuboid shape and with a rectangular and/or square cross section. However, it will be appreciated that the bale chamber structure 114 may be configured to form bales of other shapes without departing from the scope of the present disclosure.

Figure 2:
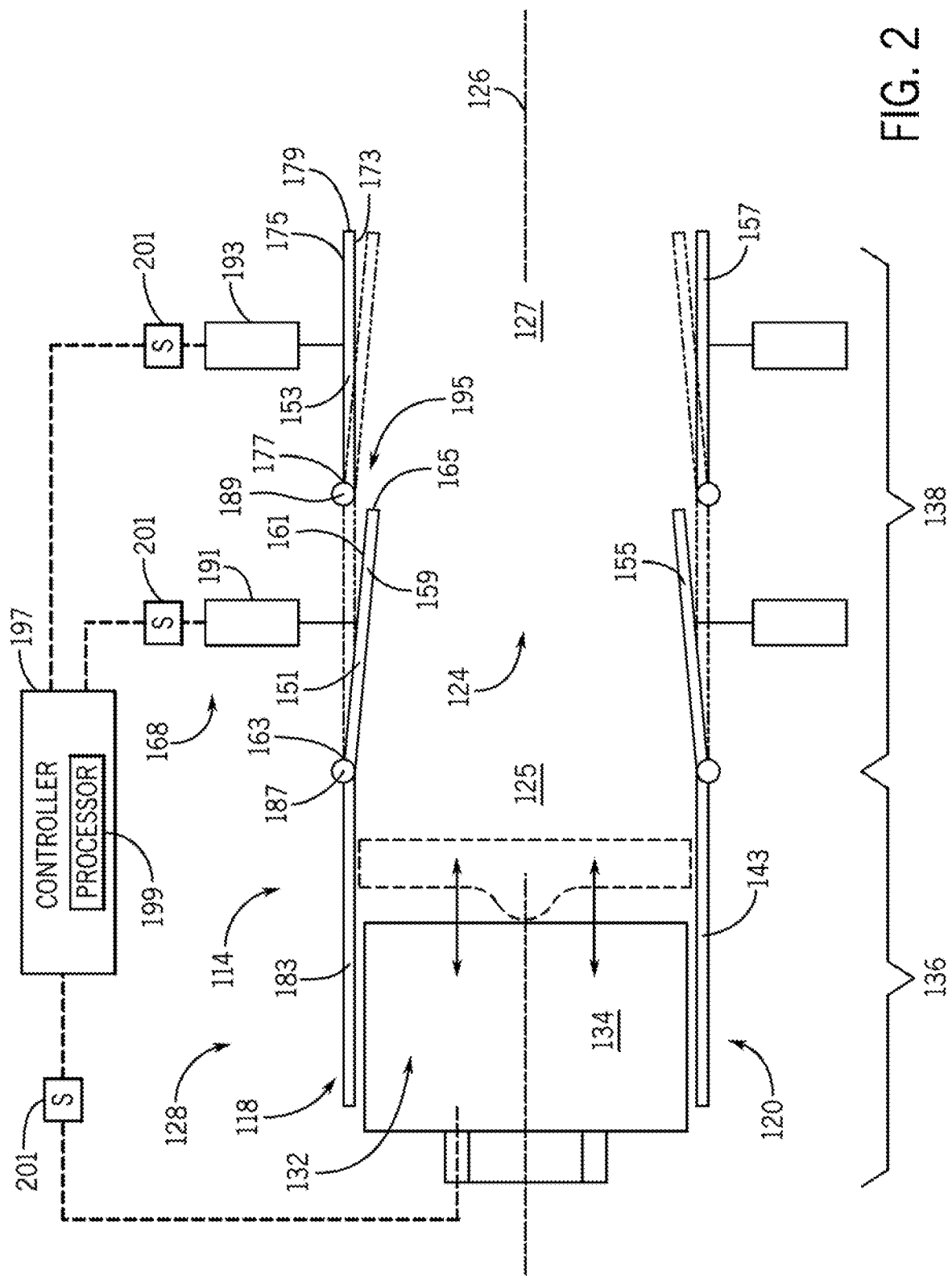
FIG. 2 is a top schematic view of the baler of FIG. 1.

The bale chamber structure 114 and the baling chamber 124 are represented schematically in FIG. 2 according to example embodiments. As shown, the baling chamber 124 may be configured to include an inlet portion 136, and a variable portion 138. The inlet portion 136 may have a substantially fixed cross sectional area and/or longitudinal profile, whereas the cross sectional area and/or longitudinal profile may be selectively varied as will be discussed. An inlet 125 of the bale chamber structure 114 may be defined proximate the transition between the inlet portion 136 and the variable portion 138, and the variable portion 138 may define an outlet 127 of the bale chamber structure 114. The inlet 125 may receive crop material from the pick-up assembly 106 (FIG. 1).

As shown in FIG. 2, the baler 100 may further include a compaction member 132. The compaction member 132 may be a reciprocating plunger 134 in some embodiments. The plunger 134 may be received at least partly within the inlet portion 136 of the baling chamber 124. The plunger 134 may reciprocate back and forth along the axis 126. The plunger 134 may reciprocate with respect to the bale chamber structure 114 to provide crop material into the baling chamber 124. The plunger 134 may also operate in cooperation with the bale chamber structure 114 to compress the crop material within the baling chamber 124. During operation, the plunger 134 may push the crop material against the internal surfaces of the chamber structure 114 and against previously formed flakes within the baling chamber 124. This action may progressively form the bale 110 as the material moves rearward along the axis 126. It will be appreciated that the baler 100 may include another compaction member 132 (other than a plunger 134) without departing from the scope of the present disclosure. For example, in an additional embodiment, the compaction member 132 may comprise an auger for moving and compacting the crop material within the baling chamber 124.

Figure 3:
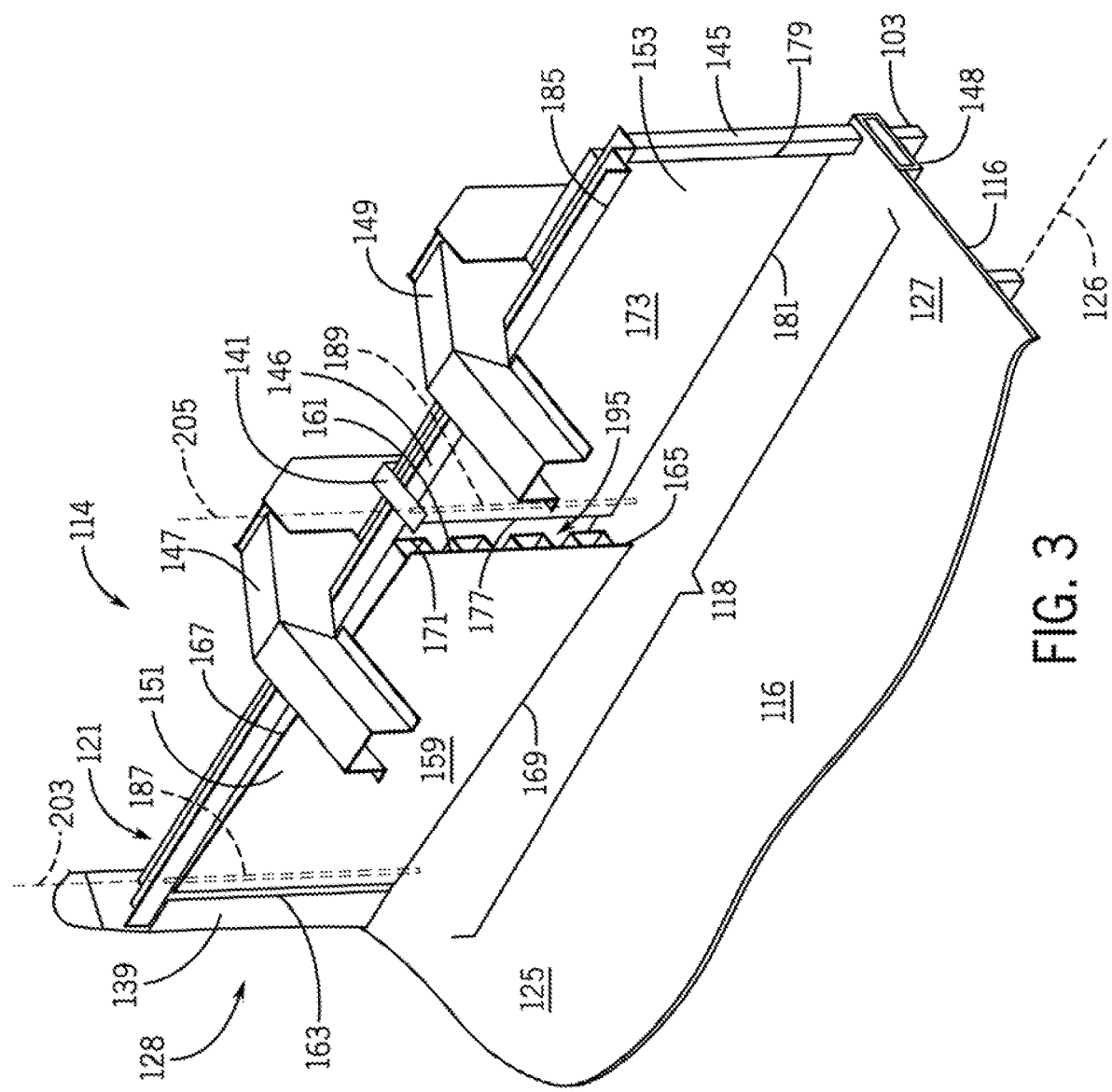
FIG. 3 is a partial perspective view of a portion of the baler of FIG. 1.

Referring now to FIGS. 1, 2, and 3, the bale chamber structure 114 will be discussed in detail according to example embodiments. As shown, the bale chamber structure 114 may include a plurality of walls 128 that cooperate to define the baling chamber 124. The walls 128 may extend along the axis 126 and may be configured for forming respective sides of the bale 110. As shown in FIG. 1, the plurality of walls 128 may include a floor 116, a first side wall 118, a second side wall 120, and a top wall 122. The first side wall 118 and the second side wall 120 are represented schematically in FIG. 2. Furthermore, in FIG. 3, the floor 116, the first side wall 118, and portions of the frame 121 are shown in detail.

The floor 116 may be horizontal and may be fixed to the frame 121 and/or the chassis 103. The first and second side walls 118, 120 may extend vertically from the floor 116 and may be spaced apart laterally to be disposed on opposite sides of the axis 126 of the baling chamber 124. As shown in FIG. 1, the top wall 122 may extend horizontally between the first and second side walls 118, 120 and may be spaced vertically from the floor 116. Accordingly, in some embodiments, the floor 116, the first side wall 118, the second side wall 120, and the top wall 122 may collectively define the rectangular or square cross section (taken perpendicular to the axis 126) of the baling chamber 124.

Referring now to FIG. 3, features of the frame 121 that support the first side wall 118 will be discussed according to example embodiments. As shown, the frame 121 may include a first elongate member 146. The first elongate member 146 may be a beam, bar, shaft, or other elongate structure that extends generally along the axis 126 of the bale chamber structure 114. The first elongate member 146 may be substantially rigid and strong and may be constructed from steel or other suitable material. The frame 121 may further include a second elongate member 148. The second elongate member 148 may also be a beam, bar, shaft, or other elongate structure that extends along the axis 126. In some embodiments, the second elongate member 148 may be fixed to the chassis 103 of the baler 100. The second elongate member 148 may be spaced apart from the first elongate member 146 at a distance in the vertical direction (i.e., in a direction that is transverse to that of the axis 126).

The frame 121 may additionally include one or more support members, such as a first support member 139, a second support member 141, and a third support member 145. The first, second, and third support members 139, 141, 145 may be struts, bars, blocks, or other strong structures. The support members 139, 141, 145 may extend vertically between and may be fixed at both ends to the first and second elongate members 146, 148. The first, second, and third support members 139, 141, 145 may be spaced apart from each other along the axis 126 with the second support member 141 disposed between the first and third support members 139, 145.

The portion of the frame 121 represented in FIG. 3, may support the first side wall 118 of the bale chamber structure 114. To this end, the first elongate member 146, the first support member 139, the second elongate member 148, and the second support member 141 may cooperatively define a substantially rectangular frame structure for supporting a portion of the first side wall 118. Likewise, the first elongate member 146, the second support member 141, the second elongate member 148, and the third support member 145 may cooperatively define a substantially rectangular frame structure for supporting another portion of the first side wall 118.

Also, as shown in FIGS. 1 and 3, the frame 121 may include a plurality of yokes, including an upstream yoke 147 and a downstream yoke 149. The upstream yoke 147 may be disposed proximate the inlet 125, and the downstream yoke 149 may be disposed proximate the outlet 127. The yokes 147, 149 may include a plurality of rigid and strong beams, brackets, etc., that are arranged to surround the walls 128 of the baling chamber 124. The yokes 147, 149 may be fixed to the first and second elongate members 146, 148. Also, in some embodiments, the yokes 147, 149 may be fixed to the chassis 103 of the baler 100.

Referring now to FIGS. 1, 2, and 3, the plurality of walls 128 will be discussed in detail according to example embodiments. The walls 128 may be supported by the frame 121. In some embodiments, one or more of the walls 128 may be fixed to the frame 121. For example, the floor 116 may be fixed to the frame 121 in some embodiments.

Also, in some embodiments, at least one segment of at least one of the walls 128 may be moveably supported by the frame 121. For example, in some embodiments, the first side wall 118, the second side wall 120, and the top wall 122 may include at least one portion that is moveably supported by the frame 121.

Moreover, in some embodiments, one or more of the walls 128 may be segmented along the axis 126, and each segment may be moveably supported by the frame 121. These moveably-attached segments may cooperatively define the respective wall 128 and may be configured for shaping one side of the bale 110 as the crop material moves along the axis 126. In the illustrated embodiment, the first and second side walls 118, 120 include such segments as will be discussed in detail. It will be appreciated that the top wall 122 and/or the floor 116 may be similarly segmented without departing from the scope of the present disclosure.

The configuration of the first side wall 118 will now be discussed in detail according to example embodiments. It will be appreciated that the second side wall 120 may be similarly configured.

As shown in FIGS. 2 and 3, the first side wall 118 may include an upstream panel 183, a first segment panel 151, and a second segment panel 153. The upstream panel and the first and second segment panels 151, 153 may be relatively flat, wall-like, substantially rectangular panels. The upstream panel 183 may be fixed to the frame 121 such that the panel 183 remains substantially parallel to the axis 126. The first segment panel 151 may be moveably attached to the frame 121, proximate the inlet 125 and the plunger 134, and the second segment panel 153 may be moveably attached to the frame 121, proximate the outlet 127. Accordingly, the upstream panel 183, the first segment panel 151, and the second segment panel 153 may be arranged sequentially along the axis 126 to cooperatively define the first side wall 118. As shown in FIG. 2, the upstream panel 183 may define the inlet portion 136, and the first and second segment panels 151, 153 may cooperatively define the variable portion 138 of the first side wall 118. Although the first side wall 118 includes two moveable segment panels (i.e., the first and second segment panels 151, 153) in the illustrated embodiment, it will be appreciated that there may be three or more segment panels in additional embodiments.

The first segment panel 151 may include an inner surface 159 that faces inward toward the axis 126 and an outer surface 161 that faces outward. The inner surface 159 may be substantially smooth and flat in some embodiments. The outer surface 161 may include a plurality of stiffening structures 171 (FIGS. 1 and 3) that extend along the axis 126 and that provide stiffening. The first segment panel 151 may also include an upstream end 163 and a downstream end 165 that extend vertically. Additionally, the first segment panel 151 may include an upper edge 167 and a lower edge 169 that extend horizontally.

Likewise, the second segment panel 153 may include an inner surface 173 that faces inward toward the axis 126 and an outer surface 175 that faces outward. The inner surface 173 may be substantially smooth and flat in some embodiments. The outer surface 175 may include the stiffening structures 171. The second segment panel 153 may also include an upstream end 177 and a downstream end 179 that extend vertically. Additionally, the second segment panel 153 may include an upper edge 185 and a lower edge 181 that extend horizontally.

The first segment panel 151 may be moveably attached to the frame 121. For example, the first segment panel 151 may be pivotally attached to the frame 121 at a first pivot joint 187. The first pivot joint 187 may extend vertically between the first elongate member 146 and the second elongate member 148 and may be attached to both. The pivot joint 187 may also be attached to the first segment panel 151, proximate the upstream end 163. As shown in FIG. 2, the first pivot joint 187 may also be substantially coincidental with the end of the upstream panel 183. The first pivot joint 187 may be a hinge configured for supporting rotation of the first segment panel 151 relative to the frame 121 about a vertical axis of rotation 203.

Accordingly, as represented in FIG. 2, the first segment panel 151 may be supported for rotational movement between a first position (shown in phantom) and a second position (shown in solid lines) relative to the frame 121. In the first position, the first segment panel 151 may be substantially parallel to the axis 126 and aligned with the first and second elongate members 146, 148. Also, in the first position, the first segment panel 151 may be received within the vertical opening defined between the first and second elongate members 146, 148. In contrast, in the second position (FIGS. 2 and 3), the first segment panel 151 may be disposed at an acute angle relative to the axis 126, and the downstream end 165 may be rotated inwardly toward the axis 126 to be spaced apart from the first and second elongate members 146, 148 (FIG. 3).

Likewise, the second segment panel 153 may be moveably attached to the frame 121. For example, the second segment panel 153 may be pivotally attached to the frame 121 at a second pivot joint 189. The second pivot joint 189 may also be attached to the second segment panel 153, proximate the upstream end 177. Accordingly, the second pivot joint 189 may be a hinge configured for supporting rotation of the second segment panel 153 relative to the frame 121 about a vertical axis of rotation 205. The second pivot joint 189 and its axis of rotation 205 may be spaced apart at a distance from the first pivot joint 187 and its axis of rotation 203 in a direction that is parallel to the axis 126. Accordingly, like the first segment panel 151, the second segment panel 153 may be supported for rotational movement between a first position (shown in solid lines) and a second position (shown in phantom lines) relative to the frame 121.

Accordingly, the first segment panel 151 may be moveably attached to the frame 121 (via the first pivot joint 187) independent of the second segment panel 153. Likewise, the second segment panel 153 may be moveably attached to the frame 121 (via the second pivot joint 189) independent of the first segment panel 151. Thus, the first segment panel 151 may be supported for movement independent of the second segment panel 153 and vice versa. Specifically, the downstream end 165 of the first segment panel 151 may be pivoted inward and outward without affecting the position of the second segment panel 153. Likewise, the downstream end 179 of the second segment panel 153 may be pivoted inward and outward without affecting the position of the first segment panel 151. This is because the first segment panel 151 may be decoupled from the second segment panel 153. The first and second segment panels 151, 153 may be independently moved, for example, to vary the size of a gap 195 between the downstream end 165 of the first segment panel 151 and the upstream end 177 of the second segment panel 153.

When the first segment panel 151 is in the first position, the downstream end 165 may be substantially aligned and/or coincidental with the upstream end 177 of the second segment panel 153. Accordingly, the gap 195 may have a reduced size and the wall 118 may be substantially continuous and uninterrupted in this region. In contrast, when the first segment panel 151 is in the second position, the downstream end 165 may be disposed inwardly such that the size of the gap 195 is increased and the wall 118 is discontinuous in this region. Likewise, the second segment panel 153 may be moved between its first and second positions, for example, for varying a cross sectional area of the outlet 127.

As shown in FIG. 2, the second side wall 120 of the baling chamber 124 may be similar to the first side wall 118. Specifically, the second side wall 120 may include an upstream panel 143, a third segment panel 155 and a fourth segment panel 157. The third segment panel 155 may be moveably attached to the frame 121, proximate the inlet 125, and the fourth segment panel 157 may be moveably attached to the frame 121, proximate the outlet 127. Accordingly, the upstream panel 143, the third segment panel 155, and the fourth segment panel 157 may be arranged sequentially along the axis 126 to cooperatively define the second side wall 120.

Moreover, as shown in FIG. 2, the baler 100 may also include an actuator system 168. Generally, the actuator system 168 may include a plurality of actuators, such as a first actuator 191 and a second actuator 193, for actuating the segment panels 151, 153 of the first side wall 118. The actuator system 168 may include similar actuators for the segment panels 155, 157 of the second side wall 120 as well.

The baler 100 may further include an associated control system 197 for controlling the first and second actuators 191, 193. The control system 197 may communicate with other systems or devices (including other controllers) in various known ways, including via a CAN bus of the baler 100 or the towing vehicle 102 wirelessly, hydraulically, or otherwise.

The first and second actuators 191, 193 may be of any suitable type. For example, the first and second actuators 191, 193 may include one or more hydraulic actuators. However, pneumatic actuators, electric motors, linear actuators, etc., may also be included without departing from the scope of the present disclosure.

The first actuator 191 may be configured to rotate the first segment panel 151 relative to the frame 121 about the axis of rotation 203. To this end, the first actuator 191 may be attached to the first segment panel 151 and may be attached to the upstream yoke 147. In the embodiment of FIG. 2, the first actuator 191 is illustrated as having a hydraulic cylinder that actuates laterally relative to the axis 126; however, it will be appreciated that the first actuator 191 may be configured differently without departing from the scope of the present disclosure. The first actuator 191 may also include a lever or other mechanism that provides a mechanical advantage for movement of the first segment panel 151 between its different positions. Likewise, the second actuator 193 may be configured to rotate the second segment panel 153 about the axis of rotation 205.

The control system 197 may include a processor 199 and a plurality of sensors 201. The sensors 201 may be of any suitable type, such as pressure sensors, proximity switches, voltmeters, and the like.

In some embodiments, at least one sensor 201 may be operably coupled to the plunger 134 to detect how much pressure that the plunger 134 is applying to the crop material and/or how much back pressure the crop material is applying to the plunger 134. Also, at least one sensor 201 may be operably coupled to the actuator 191 to: (a) detect the load on the actuator 191; (b) detect the position and/or orientation of the first segment panel 151; and/or (c) detect another characteristic associated with movement of the first segment panel 151. Also, at least one sensor 201 may be operably coupled to the actuator 193 for detecting similar conditions associated with the actuator 193 and/or the segment panel 153.

The control system 197 may generate and send control signals to reciprocate the plunger 134. The control system 197 may also generate and send control signals to the actuator 191 and/or the actuator 193 for moving and adjusting the first and/or second segment panels 151, 153. Likewise, the control system 197 may generate and send control signals to actuators for moving the third and fourth segment panels 155, 157 of the second side wall 120.

Various methods may be used for operation of the control system 197. The processor 199 may determine a target characteristic of the baling chamber 124 (i.e., a baling chamber characteristic) before the baling process begins. In some embodiments, the processor 199 may determine a target longitudinal profile for the baling chamber 124. The target profile may include, for example, target positions for the first, second, third and fourth segment panels 151, 153, 155, 157. The control system 197 may generate and send control signals to the actuators such that the actual profile of the baling chamber 124 achieves the target profile determined by the processor 199. Additionally, in some embodiments, the processor 199 may determine a target pressure for the actuator system 168 to apply to the segment panels 151, 153, 155, 157, and the control system 197 may generate and send control signals to the actuators for achieving the target loads.

Also, in some embodiments, the sensor(s) 201 may provide respective feedback signals back to the processor 199. The processor 199 may receive the feedback and process the feedback for various purposes. For example, the feedback may allow the processor 199 to determine how to adjust the position and/or pressure on the segment panels 151, 153, 155, 157. Ultimately, the control system 197 may make these adjustments to provide the bale 110 with a predetermined shape and geometry and with a predetermined density.

Accordingly, the baler 100 of the present disclosure provides a highly adjustable and controllable baling chamber 124. The baling chamber 124 may be varied to, for example, change the cross-sectional area (and, thus, the longitudinal profile) of the baling chamber 124. The baling chamber 124 may also be adjusted to vary and control the amount of friction between the crop material and the internal surface of the bale chamber structure 114. Accordingly, the baler 100 of the present disclosure may repeatedly provide bales 110 that have a substantially consistent shape and density during operation, regardless of the quality of the crop material being baled.

Furthermore, because the walls 118, 120 are segmented, excessive rebound of the crop material (i.e., movement of the crop material upstream along the axis 126) may be avoided. For example, the downstream end 165 of the first segment panel 151 may block crop material that tends to rebound in the upstream direction, especially when moved inward toward the axis 126. The third segment panel 155 may similarly prevent rebound of the crop material.

Also, the segments of the walls 118, 120 are relatively short (as measured along the axis 126), especially as compared to existing chamber structures with a single pivoting panel that extends along the entire length of the chamber. Accordingly, the segment panels 151, 153, 155, 157 may be stiffer and may resist bending due to the reduced length. This feature may also allow for more uniformly distributed pressure against the surfaces of the bale 110. Moreover, the plurality of pivot joints 187, 189 distributes loads more evenly to the frame 121 as compared to conventional bale chamber structures.

Moreover, in some cases, adjustments to the segment panels 151, 153, 155, 157 may be less dependent on crop conditions as compared to existing bale chamber structures. This is because there is reduced contact area between the segment panels 151, 153, 155, 157 and the crop material.

In addition, the bale chamber structure 128 may be relatively short as compared to those of the prior art. This may improve transport mobility of the baler 100.

Lastly, the baler 100 may facilitate ejection of the crop material. For example, at the end of a run, the user may wish to remove the last of the crop material from the baling chamber 124. Because the second segment panel 153 is relatively short, the actuator 193 may only need to move through a small stroke to move the second segment panel 153 sufficiently for removal of the crop material. The same may be true for the fourth segment panel 157 and its actuator.

Thus, the baler 100 provides a high degree of precision when adjusting the baling chamber 124. Also, several features provide added convenience for the user.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A baler configured to form a bale of crop material, the baler comprising:
    a frame;
    a bale chamber structure that is supported by the frame, the bale chamber structure including a first wall and a second wall that cooperate to define a baling chamber in which the bale is formed that extends along a longitudinal axis, the first and second walls configured to shape different sides of the bale, wherein the first wall includes:
        a first segment panel that is moveably attached to the frame; and
        a second segment panel that is arranged in a downstream direction from the first segment panel with respect to the longitudinal axis, the second segment panel being moveably attached to the frame independent of the first segment panel, wherein the first segment panel and the second segment panel cooperate in the forming of the bale in the baling chamber; and
    wherein the second wall includes:
        a third segment panel that is moveably attached to the frame; and
        a fourth segment panel that is arranged in a downstream direction from the first segment panel with respect to the longitudinal axis, the fourth segment panel being moveably attached to the frame, the fourth segment panel being decoupled from the third segment panel and configured for movement independent of the third segment panel.

2. The baler of claim 1, wherein the first segment panel is moveably attached to the frame via a first joint;
    wherein the second segment panel is moveably attached to the frame via a second joint; and
    wherein the first joint and the second joint are spaced apart along the longitudinal axis.

3. The baler of claim 2, wherein at least one of the first joint and the second joint is a pivot joint.

4. The baler of claim 3, wherein the first segment panel is moveably attached to the frame via the pivot joint;
    wherein the pivot joint is configured to rotate the first segment panel about an axis of rotation;
    wherein the first segment panel includes an upstream end and a downstream end; and
    wherein the axis of rotation is proximate the upstream end.

5. The baler of claim 4, wherein the axis of rotation extends substantially along a vertical direction.

6. The baler of claim 2, wherein the frame includes a first elongate member and a second elongate member that extend along the longitudinal axis;
    wherein the first elongate member and the second elongate member are spaced apart in a direction that is transverse to the longitudinal axis; and
    wherein at least one of the first joint and the second joint is attached to the first elongate member and the second elongate member.

7. The baler of claim 1, further comprising an actuator system with a first actuator and a second actuator;
    wherein the first actuator is configured to actuate the first segment panel relative to the frame independent of the second segment panel; and
    wherein the second actuator is configured to actuate the second segment panel relative to the frame independent of the first segment panel.

8. The baler of claim 7, wherein the first actuator is configured to rotate the first segment panel relative to the frame about a first axis of rotation; and
    wherein the second actuator is configured to rotate the second segment panel relative to the frame about a second axis of rotation.

9. The baler of claim 7, further comprising a control system configured to communicate with the first actuator for controlled actuation of the first segment panel; and
    wherein the control system is configured to communicate with the second actuator for controlled actuation of the second segment panel.

10. The baler of claim 1, wherein the frame includes a first elongate member and a second elongate member that extend along the longitudinal axis;
    wherein the first elongate member and the second elongate member are spaced apart to define an opening therebetween; and
    wherein the first segment panel and the second segment panel are received within the opening and are configured to move within the opening relative to the frame.

11. The baler of claim 1, wherein the first segment panel includes a first upstream end and a first downstream end;
    wherein the second segment panel includes a second upstream end and a second downstream end;
    wherein the second upstream end is disposed proximate the first downstream end;
    wherein the first segment panel is configured for movement independent of the second segment panel to vary a gap defined between the second upstream end and the first downstream end.

12. A baler configured to form a bale of crop material, the baler comprising:
    a frame;
    a bale chamber structure that is supported by the frame and defines an inlet and an outlet, the bale chamber structure including a plurality of walls that cooperate to define a baling chamber in which the bale is formed that extends along a longitudinal axis, the plurality of walls configured to shape different sides of the bale, at least one of the plurality of walls including:

a first segment panel that is moveably attached to the frame; and a second segment panel that is arranged in a downstream direction from the first segment panel with respect to the longitudinal axis, the second segment panel being moveably attached to the frame independent of the first segment panel, wherein the first segment panel and the second segment panel cooperate in the forming of the bale in the baling chamber; and a compaction member disposed proximate the inlet of the baling chamber and configured to move the crop material away from the inlet of the baling chamber toward the outlet of the baling chamber and form the bale; and wherein the first segment panel is disposed proximate the compaction member; and wherein the second segment panel partly defines the outlet.

13. A method of operating a baler having a bale chamber structure that defines a variable baling chamber in which the bale is formed that extends along a longitudinal axis, the baling chamber partly defined by a wall configured to define a side of a bale of crop material, the method comprising:

actuating a first segment panel of the wall relative to a frame about a first joint that moveably attaches the first segment panel to the frame; and actuating a second segment panel of the wall relative to the frame about a second joint that moveably attaches the second segment panel to the frame independent of the first segment panel;

wherein the first segment panel and the second segment panel cooperate in the forming of the bale in the baling chamber; and wherein at least one of actuating the first segment panel and actuating the second segment panel includes rotating the one of the first panel and the second panel relative to the frame about an axis of rotation that extends substantially along a vertical direction.

14. The method of claim 13, further comprising determining, by a processor of a control system, a baling chamber characteristic;

wherein actuating the first segment panel includes actuating the first segment panel according to the baling chamber characteristic; and wherein actuating the second segment panel includes actuating the second segment panel according to the baling chamber characteristic.

15. The method of claim 14, wherein the baling chamber characteristic is a dimension of the baling chamber.

16. The method of claim 14, wherein the baling chamber characteristic is a chamber pressure characteristic.

17. A baler configured to form a rectangular bale of crop material, the baler comprising:

a frame with a first elongate member and a second elongate member that are spaced apart in a vertical direction to define an opening between the first elongate member and the second elongate member;

a bale chamber structure that is supported by the frame, the bale chamber structure including a plurality of walls that cooperate to define a baling chamber in which the bale is formed that extends along a longitudinal axis, the plurality of walls configured to shape different sides of the bale, at least one of the plurality of walls including a first segment panel that is received in the opening and moveably attached to the first elongate member and the second elongate member via a first pivot joint, the at least one of the plurality of walls including a second segment panel that is arranged in a downstream direction from the first segment panel with respect to the longitudinal axis, the second segment panel being received in the opening and moveably attached to the first elongate member and the second elongate member via a second pivot joint that is independent of the first segment panel, the second segment panel configured for movement that varies a size of a gap between the first segment panel and the second segment panel;

an actuator system configured to independently actuate the first segment panel and the second segment panel relative to the frame; and a control system configured to control the actuator system to control independent movement of the first segment panel and the second segment panel relative to the frame in forming the bale in the baling chamber, the control system:

determining a baling chamber characteristic of either a dimension or pressure of the baling chamber; and controlling the actuator system to actuate the first segment panel and the second segment panel according to the baling chamber characteristic.

* * * * *

UNITED STATES PATENT AND TRADEMARK OFFICE
CERTIFICATE OF CORRECTION

PATENT NO. : 10,945,377 B2
APPLICATION NO. : 15/895395
DATED : March 16, 2021
INVENTOR(S) : Roth et al.

It is certified that error appears in the above-identified patent and that said Letters Patent is hereby corrected as shown below:

In the Claims

In Column 13, Claim 13, Line 36, delete "first panel and the second panel" and insert -- first segment panel and the second segment panel --, therefor.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*